W. B. HUNTER.
PISTON RING REMOVER.
APPLICATION FILED MAR. 13, 1919.

1,318,494.

Patented Oct. 14, 1919.

Inventor
William B. Hunter
By his attorney,
Charles N. Goodrich.

UNITED STATES PATENT OFFICE.

WILLIAM B. HUNTER, OF FITCHBURG, MASSACHUSETTS.

PISTON-RING REMOVER.

1,318,494.      Specification of Letters Patent.      Patented Oct. 14, 1919.

Application filed March 13, 1919. Serial No. 282,448.

*To all whom it may concern:*

Be it known that I, WILLIAM B. HUNTER, a citizen of the United States, residing at Fitchburg, in the county of Middlesex and State of Massachusetts, have invented new and useful Improvements in Piston-Ring Removers, of which the following is a specification.

This invention relates to a device for removing packing rings from a piston.

It is well known to those skilled in the art that it is a difficult and tedious job to take the packing rings out of their grooves and remove them from a piston, and it is the object of this invention to provide a device for easily accomplishing this result.

The invention consists in a split sleeve of spring metal having one end thereof so formed as to provide a point which can be inserted in the packing ring and used to spread the ring and simultaneously to transfer the ring from its groove in the piston to the outside of said sleeve.

The invention further consists in a sleeve adapted to remove packing rings from pistons such as hereinafter described and particularly of the construction set forth in the claims.

Referring to the drawings.

Like numerals refer to like parts throughout the several views of the drawings.

Figure 1:
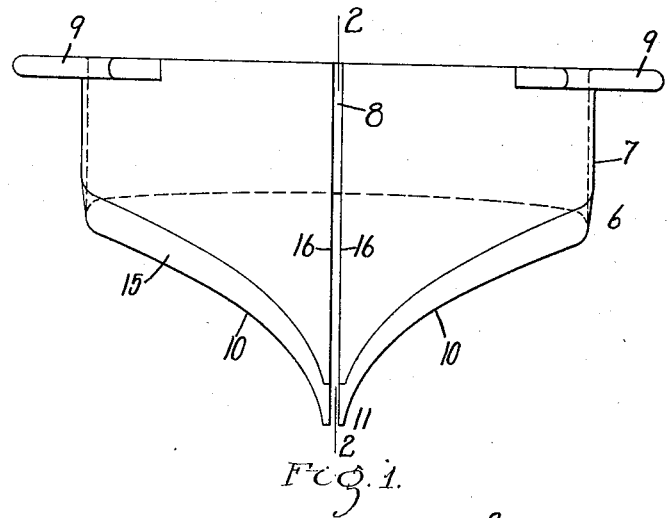
Figure 1 is a front elevation of my improved piston ring remover.

In the drawings, 6 is the remover which consists of a cylindrical sleeve portion 7 of thin spring metal, split longitudinally thereof at 8 and provided with a pair of oppositely disposed segmental flanges 9. One end of the sleeve 7 is extended longitudinally of the sleeve forming a curved edge 10 which terminates in a divided point 11.

Figure 2:
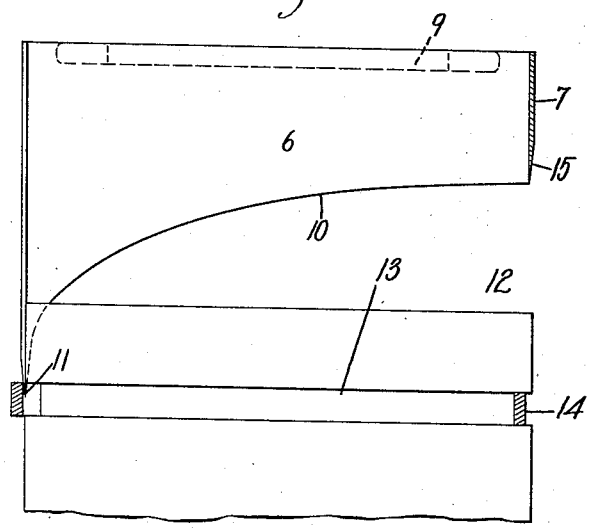
Fig. 2 is a sectional elevation taken on line 2—2 of Fig. 1, but showing the remover in position relatively to a piston and piston ring when the same is first inserted between the ring and the piston, the piston ring being shown in section.
Figure 3:
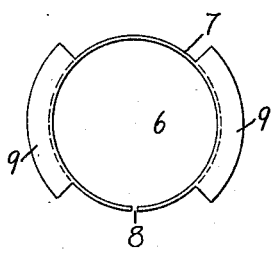
Fig. 3 is a plan view of the remover.

12 is a piston cylinder provided with a groove 13 to receive a piston packing ring 14. When the piston packing ring 14 is pushed to one side in its groove, as illustrated in Fig. 2, there is a slight space between the inner bore of the packing ring and the periphery of the piston at one side of said piston, and in removing the piston ring from its groove said piston ring 14 is pushed into the position illustrated in Fig. 2 and the double pointed end 11 of the remover sleeve 7 is inserted in said space, with the inner surface of the sleeve resting against the periphery of the cylinder. Said remover is then pushed downwardly, the operator taking hold of the segmental flanges 9 in order to conveniently force the sleeve downwardly along the periphery of the piston 12 and the inclined curved edges 10 of said remover will thus be gradually forced in between the inner bore of the piston ring and the periphery of the piston 12 until said ring is spread apart and is forced up onto the periphery of the sleeve.

Figure 4:
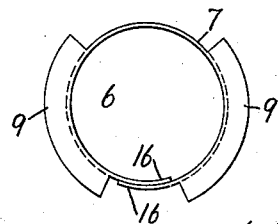
Fig. 4 is a plan view of the remover showing the same compressed with its adjacent edges overlapping.
Figure 5:
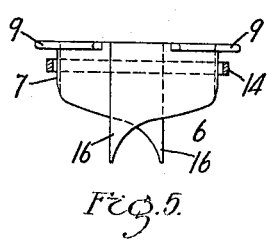
Fig. 5 is a front elevation of the remover with its adjacent edges overlapping and a piston ring shown in section relatively thereto.

It will be noted that in order to aid in this operation the lower end of the sleeve 7 is beveled on its outer surface at 15. When the piston ring has been thus forced up onto the periphery of the remover 7, the remover is slid off of the piston and thus the ring is also removed from the piston. To remove the piston ring from the remover, said remover is compressed so that the opposite edges 16 overlap, as illustrated in Figs. 4 and 5, and the piston ring 14 will then drop off of the remover.

Having thus specifically described my invention, what I claim and desire by Letters Patent to secure is:

1. A piston ring remover consisting of a metal sleeve having one end extended longitudinally thereof at one side of said remover.

2. A piston ring remover consisting of a metal sleeve having one end extended longitudinally thereof at one side of said remover to form a wedge.

3. A piston ring remover consisting of a metal sleeve having one end extended longitudinally thereof at one side of said remover to form a pointed end and being split longitudinally thereof.

4. A piston ring remover consisting of a metal sleeve having one end extended longitudinally thereof at one side of said remover to form a pointed end, said sleeve being split longitudinally thereof through said pointed end.

5. A piston ring remover consisting of a metal sleeve having one end extended longitudinally thereof at one side of said remover to form a pointed end, said sleeve being split longitudinally thereof through said pointed end to form a double wedge.

6. A piston ring remover consisting of a metal sleeve having one end extended longitudinally thereof at one side of said remover to form a pointed end, said sleeve being beveled on the outer portion of said pointed end.

7. A piston ring remover consisting of a metal sleeve having one end extended longitudinally thereof at one side of said remover and a flange on the periphery of said sleeve.

8. A piston ring remover consisting of a metal sleeve having one end extended longitudinally thereof at one side of said remover and a pair of oppositely disposed segmental flanges on said sleeve.

In testimony whereof I have hereunto set my hand in presence of a subscribing witness.

WILLIAM B. HUNTER.

Witness:
 FRANKLIN E. LOW.

Copies of this patent may be obtained for five cents each, by addressing the "Commissioner of Patents, Washington, D. C."